United States Patent [19]
Waugh

[11] Patent Number: 5,439,130
[45] Date of Patent: Aug. 8, 1995

[54] DEBRIS CAP WITH LOCKING SYSTEM

[75] Inventor: Gary C. Waugh, Scottsdale, Ariz.

[73] Assignee: S. W. Services, Phoenix, Ariz.

[21] Appl. No.: 210,477

[22] Filed: Mar. 21, 1994

[51] Int. Cl.6 .............................................. B65D 55/14
[52] U.S. Cl. ...................................... 220/210; 138/89;
138/96 R; 220/315; 70/164; 70/212; 292/148
[58] Field of Search ................ 220/725, 210; 137/383,
137/384.2; 292/148, 151; 138/89; 70/163, 164

[56] References Cited
U.S. PATENT DOCUMENTS

| | | | |
|---|---|---|---|
| 2,324,633 | 7/1943 | McCarthy et al. | 137/385 X |
| 3,747,541 | 7/1973 | Reese | 138/89 X |
| 4,921,123 | 5/1990 | Mizioch | 138/89 X |
| 5,353,833 | 11/1994 | Martinez | 137/385 |

Primary Examiner—Stephen P. Garbe
Assistant Examiner—Robin A. Hylton
Attorney, Agent, or Firm—Cahill, Sutton & Thomas

[57] ABSTRACT

A debris cap is provided with a locking post that is insertable into an opening in the closure of the cap so that a lock engaging the manipulating handle of the cap and the locking post prevents unauthorized removal of the cap.

3 Claims, 1 Drawing Sheet

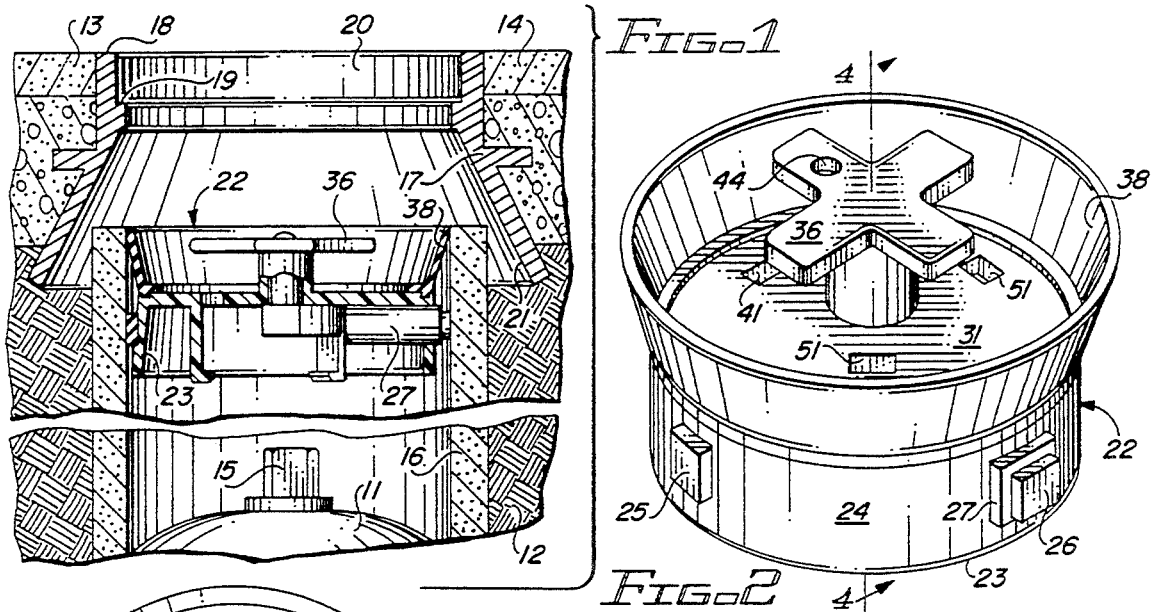

DEBRIS CAP WITH LOCKING SYSTEM

TECHNICAL FIELD

This invention is concerned with a lockable debris cap for closing the upper end of an access pipe to an underground shut-off valve.

BACKGROUND ART

Municipal utilities usually bury their mains under public rights of way, such as streets. At spaced intervals throughout the system, normally open shut-off valves are incorporated for the purpose of isolating main breaks so they can be repaired.

The shut-off valves are frequently buried several feet beneath the street and access pipes are provided which extend upwardly from the valve to near street level. The access pipe provides a passage for a tool which can be manipulated from street level to actuate the valve.

A cover with a removable lid is usually incorporated into the street pavement to prevent debris from filling the access pipe. These lids usually have lift openings therein which allow some debris to pass the cover. In addition, vehicle movement and vandalism often cause the lids of these covers to be displaced and even lost. These factors allow debris to enter the access pipe and prevent or delay access to the valve. Time is important in repairing gas and water main breaks and the need to clean out an access pipe can significantly delay such repairs.

U.S. Pat. No. 4,921,123, granted May 1, 1990, to G. J. Mizioch for "DEBRIS CAP" discloses an inexpensive and easily installed debris cap for closing the upper end of an access pipe. That cap employs a cam-actuated slide for wedging the cap in place in the pipe. The cam is manipulated by means of a rotatable handle positioned atop the cap.

The ease of installation and removal of the Mizioch debris cap is both an advantage and a disadvantage. It is very helpful for legitimate installers and removers of the cap. But it also makes it easy for vandals to steal the cap and allow debris to enter the valve access pipe. There continues to be a need for a debris cap which is easily installed and removed by authorized personnel, but which can be locked in position to prevent unauthorized removal.

DISCLOSURE OF THE INVENTION

This invention is applicable to debris caps of the type disclosed in the aforementioned Mizioch patent comprising a hollow member with a cylindrical outer surface and a closure extending across the cylinder. A handle atop the closure is rotatable to cause a slide to engage and disengage the wall of the pipe in which the debris cap is installed.

In accordance with this invention, the debris cap assembly includes a post which is preferably removable and insertable into an opening provided in the cap in close proximity to the handle. The assembly further includes a lock which is engageable with the handle and the locking post to prevent rotation of the handle.

BRIEF DESCRIPTION OF THE DRAWINGS

The invention is described in greater detail hereinafter by reference to the accompanying drawings, wherein:

FIG. 1 is a fragmentary and foreshortened illustration of a typical main shut-off valve installation with the debris cap of this invention in use therein;

FIG. 2 is a perspective view from above of the cap of this invention;

FIG. 3 is a plan view of the underside of the cap;

FIG. 4 is an enlarged vertical sectional view of the cap taken as indicated by the line 4—4 in FIG. 2;

FIG. 5 is a perspective view of a locking post employed in the cap of this invention; and FIG. 6 is a fragmentary, vertical, sectional view through the cap, showing the locking post and a lock in position on the cap.

BEST MODE FOR CARRYING OUT THE INVENTION

Referring particularly to FIG. 1, a shut-off valve is identified by reference numeral 11. The valve 11 is buried in earth 12 beneath a street 13, the pavement for which is indicated at 14.

Valve 11 may be buried several feet beneath the surface of street 13 and access must be provided to an actuator 15 on the valve through the earth 12. This is usually provided by an access pipe 16 which rests on top of the valve 11 and extends up to within a few inches of the surface of the street 13. It is thus possible for workmen on the street 13 to insert a tool into the opening through access pipe 16 to engage valve actuator 15 to manipulate the valve 11 to shut it or to open it. Access pipe 16 may be formed of concrete or other strong material capable of resisting pressure from the surrounding earth 12.

In most shut-off valve installations, the upper end of the access pipe 16 terminates within a flange cover 17 embedded within the street pavement 14. Cover 17 has an upper circular surface 18 flush with the surface of the street and has a circular lip 19 therebeneath for supporting a circular lid 20. A flared skirt 21 on cover 17 receives the upper end of access pipe 16.

The lid 20 of cover 17 may have lift openings therein which permit dirt and other debris to enter access pipe 16. Moreover, it is not at all unusual for the lid 20 of cover 17 to be displaced by normal vehicle movement or by vandalism. Over time, the access pipe 16 can become filled to the extent that a tool can no longer be placed therein to reach valve actuator 15. If it becomes necessary to close valve 11, a crew must perform the arduous and time-consuming task of cleaning debris from the access pipe 16. And, the time element is certainly important in repairing a broken gas or water main.

To prevent debris accumulating in access pipe 16, it is desirable to cap the pipe opening at or near its open end.

According to this invention, the pipe 16 is closed by a removable debris cap indicated generally by reference numeral 22. Cap 22 comprises a hollow cylindrical member 23 having a generally cylindrical outer surface 24. Spaced around the periphery of surface 24 are a plurality of resilient, elastic pads. In the embodiment shown in the drawing, three such pads are employed, although a greater number can be employed if desired. Two of the pads, designated by numeral 25, are stationarily mounted on the hollow cylindrical member 23. The other pad 26 is carried on the outer end of the slide 27 movably carried in a passage 28 in the wall of cylinder member 23. Mounting for slide 27 permits it to reciprocate along a path disposed radially with respect to the cylindrical surface 24.

Movement of the slide 27 and the pad 26 carried thereby is effected by a cam 29 acting against resilient means, such as a spring-loaded plunger 30, housed in the inner end of slide 27. Cam 29 is positioned beneath a closure plate, or wall, 31 extending across the hollow member 23. Cam 29 preferably has a boss 32 extending upwardly through an opening 33 provided in the closure 31 coaxially of the hollow member 23.

Cam boss 32 extends into and mates with a noncircular opening 34 in the base 35 of a handle 36. The cam 29 and handle 36 are preferably held in place on opposite surfaces of the closure 31 by suitable means, such as a pin 37 extending transversely through the handle base 35 and cam boss 32.

When cap 22 is positioned within the upper end of the access pipe 16, as illustrated in FIG. 1, rotation of handle 36 causes cam 29 to move slide 27 outwardly of the hollow cylindrical member 23 of the cap. This effectively increases the contact diameter of pads 25 and 26, causing the pads to frictionally engage the inner surface of pipe 16 to hold the cap in place therein.

The hollow member portion 23 of cap 22 is preferably made with the diameter of its outer surface 23 slightly less than the inside diameter of access pipe 16 to facilitate installation and removal of the cap. If desired, the cap 22 may also include an upwardly and outwardly flared elastic skirt 38 to prevent debris from passing downwardly through the space between the pipe and the cap member surface 24.

In accordance with this invention, the debris cap 22 is equipped with means for locking handle 36 against rotation to prevent unauthorized removal of the cap. This locking means includes a removable locking post 39 having a finger portion 40 that is insertable into an opening 41 in closure 31 of the cap. The opening 41 is positioned such that with the locking post 39 inserted therein, a hole 42 in the head 43 of the locking post is aligned with a similar sized hole 44 in one of the fingers of handle 36 when the handle has been turned to wedge the cap 22 in place in pipe 16. With the locking post hole 42 aligned with handle hole 44, a locking device inserted through both holes effectively locks handle 36 to post 39, preventing rotation of the handle 36. This locking device may, for example, take the form of a padlock 45, the shackle 46 of which is passed through holes 42 and 44 (see FIG. 6).

When the debris cap 22 is to be installed in a pipe 16, the locking post 39 is inserted into opening 41. Next, the handle 36 is turned to cause cam 29 to move spring-loaded plunger 30 outwardly, wedging pads 25 and 26 against the interior of pipe 16. When cam 29 has been rotated to the position shown in FIG. 3 in which a flat surface 47 is in contact with plunger 30, hole 44 in the handle 36 is aligned with the hole 42 in the locking post. Thereafter, padlock 45 can be inserted and closed to prevent rotation of handle 36.

If the debris cap 22 is to include means for holding a locating coil, shown in phantom at 48, several depending fingers 49 with retaining lips 50 can be molded onto the lower surface of closure 31. One finger 49 is preferably positioned immediately adjacent opening 41 in the closure 31. With this relationship, a mold core (not shown) provided for opening 41 can also be employed to form the retaining lip 50 on that one finger 49. Additional openings 51 adjacent the other fingers 49 are provided for coring the retaining lips 50 on these fingers.

From the foregoing, it should be apparent that this invention provides a debris cap which can be firmly locked in position within an access pipe to prevent unauthorized removal.

What is claimed is:

1. In a debris cap comprising a hollow member having a cylindrical outer surface, a closure for the hollow member, a slide having inner and outer ends mounted for reciprocal radial movement in said member, the outer end of said slide being extendable beyond the outer surface of said member, a cam mounted on said closure for rotation with respect to the hollow member, said cam being engageable with the inner end of said slide for moving said slide radially, a handle for manipulating said cam, said handle and said cam being rotatable amount a common axis extending longitudinally of said hollow member, said cover having a plurality of openings therein spaced from said common axis, a locking post selectively insertable into one of said openings in the cover, said handle and said locking post having openings therein which, when aligned, are adapted to receive the shackle of a padlock, and a padlock, the shackle of which is engageable with said handle and said locking post for preventing rotation of said handle.

2. The debris cap of claim 1, further characterized in that said cover has a plurality of locating coil support fingers depending therefrom, at least one of said support fingers being located adjacent one of said openings in said cover.

3. The debris cap of claim 1, further characterized in that resilient means are provided between said cam and said slide for biasing said slide radially outwardly.

* * * * *